United States Patent
Yang

(10) Patent No.: US 10,977,664 B2
(45) Date of Patent: Apr. 13, 2021

(54) METHOD AND APPARATUS FOR TRANSFERRING FROM ROBOT CUSTOMER SERVICE TO HUMAN CUSTOMER SERVICE

(71) Applicant: ADVANCED NEW TECHNOLOGIES CO., LTD., Grand Cayman (KY)

(72) Inventor: Minghui Yang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/888,801

(22) Filed: May 31, 2020

(65) Prior Publication Data

US 2020/0294063 A1   Sep. 17, 2020

Related U.S. Application Data

(63) Continuation of application No. PCT/CN2018/125297, filed on Dec. 29, 2018.

(30) Foreign Application Priority Data

Jan. 26, 2018  (CN) .......................... 2018 1 0076926

(51) Int. Cl.
G06N 3/04 (2006.01)
G06N 3/08 (2006.01)
(Continued)

(52) U.S. Cl.
CPC .......... *G06Q 30/016* (2013.01); *G06F 40/40* (2020.01); *G06N 3/0445* (2013.01);
(Continued)

(58) Field of Classification Search
CPC .......... G06Q 30/016; G06Q 10/06393; G06F 40/40; G06N 3/0445; G06N 3/08; G06N 3/0454
See application file for complete search history.

(56) References Cited

U.S. PATENT DOCUMENTS 8,005,673 B2   8/2011  Nagashima
8,612,223 B2  12/2013  Minamino et al.
(Continued)

FOREIGN PATENT DOCUMENTS

CN   103456297 A   12/2013
CN   105072173 A   11/2015
(Continued)

OTHER PUBLICATIONS

First Search and First Office Action of CN Application No. 2018100769267, dated Jan. 3, 2020 (30 Pages).
(Continued)

*Primary Examiner* — Hal Schnee

(57) ABSTRACT

Methods, systems, and devices, including computer programs encoded on computer storage media for transferring a robot customer service to a human customer service are provided. One of the methods includes: obtaining conversation characteristics from at least one round of conversations between the robot customer service and a customer; obtaining state characteristics of the customer; inputting the conversation characteristics and the state characteristics into a confidence score evaluation model to obtain a confidence score evaluation value; and when the confidence score evaluation value meets a robot-to-human intervention condition, transferring the customer to the human customer service. The confidence score evaluation model is a machine learning model, comprising a linear sub-model input with the conversation characteristics and a deep neural network sub-model input with the state characteristics.

14 Claims, 3 Drawing Sheets

(51) Int. Cl.
  *G06Q 30/00* (2012.01)
  *G06F 40/40* (2020.01)
  *G06Q 10/06* (2012.01)

(52) U.S. Cl.
  CPC ............ *G06N 3/0454* (2013.01); *G06N 3/08* (2013.01); *G06Q 10/06393* (2013.01)

(56) References Cited

U.S. PATENT DOCUMENTS

| | | |
|---|---|---|
| 8,788,439 B2 | 7/2014 | Martinez et al. |
| 8,965,770 B2 | 2/2015 | Petrushin |
| 9,177,318 B2 | 11/2015 | Shen et al. |
| 9,635,181 B1 | 4/2017 | McGann et al. |
| 9,728,184 B2 | 8/2017 | Xue et al. |
| 9,990,591 B2 | 6/2018 | Gelfenbeyn et al. |
| 10,262,658 B2 | 4/2019 | Fu |
| 10,319,366 B2 | 6/2019 | Lev-Tov et al. |
| 10,332,507 B2 | 6/2019 | Tang |
| 10,672,397 B2 | 6/2020 | Lee et al. |
| 2002/0194002 A1 | 12/2002 | Petrushin |
| 2015/0201077 A1 | 7/2015 | Konig et al. |
| 2017/0013127 A1 | 1/2017 | Xue et al. |
| 2017/0195486 A1 | 7/2017 | Li et al. |
| 2017/0223190 A1 | 8/2017 | Mandel et al. |
| 2017/0300814 A1 | 10/2017 | Snaked et al. |
| 2017/0300831 A1* | 10/2017 | Gelfenbeyn ............ G10L 15/30 |
| 2017/0359464 A1* | 12/2017 | Segalis ................. G06N 20/00 |
| 2018/0330226 A1 | 11/2018 | Jiang et al. |
| 2019/0147231 A1* | 5/2019 | Kim ..................... G06F 16/954 |
| | | 382/181 |

FOREIGN PATENT DOCUMENTS

| | | |
|---|---|---|
| CN | 105592237 A | 5/2016 |
| CN | 105701088 A | 6/2016 |
| CN | 105808652 A | 7/2016 |
| CN | 106909930 A | 6/2017 |
| CN | 107071193 A | 8/2017 |
| CN | 107451199 A | 12/2017 |
| CN | 107506372 A | 12/2017 |
| CN | 107590159 A | 1/2018 |
| CN | 108363745 A | 8/2018 |
| CN | 106611597 B | 11/2019 |
| CN | 105874530 B | 3/2020 |
| CN | 108363745 B | 6/2020 |
| TW | 201800987 A | 1/2018 |
| WO | WO-2018006727 A1 * | 1/2018 ............. G06F 16/00 |

OTHER PUBLICATIONS

Second Office Action of CN Application No. 2018100769267, dated Feb. 21, 2020 (31 Pages).
Third Office Action of CN Application No. 2018100769267, dated Feb. 21, 2020 (32 Pages).
International Preliminary Report of Patentability of Application No. PCT/CN2018/125297, dated Jul. 26, 2020, (11 pages).
Search Report of Taiwan Application No. 107145199, dated Nov. 12, 2019, (1 page).
International Search Report of Application No. PCT/CN2018/125297, dated Aug. 1, 2019, (6 pages).
Search Report for European Application No. 18 902 124.9 dated Aug. 27, 2020.

* cited by examiner

METHOD AND APPARATUS FOR TRANSFERRING FROM ROBOT CUSTOMER SERVICE TO HUMAN CUSTOMER SERVICE

CROSS-REFERENCE TO RELATED APPLICATIONS

The present application is a continuation application of International Application No. PCT/CN2018/125297, filed on Dec. 29, 2018, which claims priority and the benefit of the Chinese Patent Application No. 201810076926.7 filed with China National Intellectual Property Administration (CNIPA) of the People's Republic of China on Jan. 26, 2018. The entire contents of the above-recognized applications are incorporated herein by reference.

TECHNICAL FIELD

The application relates to the technical field of data processing, and in particular, to a method and apparatus for transferring a robot customer service to a human customer service.

BACKGROUND

With the development of the Internet, virtual robots based on artificial intelligence have been used more and more widely in customer services provided by the enterprises. A robot providing customer service does not need to rest and can respond to customers' questions in a faster and more standardized manner, communicating with customers using voice conversation or text chats and releasing human customer service representatives from answering a large number of repeated questions.

For some unconventional customer questions, a robot customer service may not usually provide the customers with satisfactory answers. Currently, the most commonly used architecture of customer service centers is the coexistence of the robot customer service and the human customer service. By default, a customer is served using the robot customer service first, and is transferred to a human customer service representative if the robot customer service is unable to solve the customer's problems. Whether a robot-to-human intervention point (i.e., the time point when the robot customer service is replaced by the human customer service) occurs appropriately has a significant influence on the operation efficiency of the customer service center and the satisfaction degree of customers.

SUMMARY

In view of above, the specification provides a method for transferring a robot customer service to a human customer service, the method comprising: obtaining conversation characteristics from at least one round of conversations between the robot customer service and a customer; obtaining state characteristics of the customer; inputting the conversation characteristics and the state characteristics into a confidence score evaluation model to obtain a confidence score evaluation value; and when the confidence score evaluation value meets a robot-to-human intervention condition, transferring the customer to the human customer service. The confidence score evaluation model is a machine learning model, comprising a linear sub-model input with the conversation characteristics and a deep neural network sub-model input with the state characteristics.

The specification further provides an apparatus for transferring a robot customer service to a human customer service, the apparatus comprising: a conversation characteristics obtaining unit, configured to obtain conversation characteristics from at least one round of conversations between the robot providing a customer service and a customer; a state characteristics obtaining unit, configured to obtain state characteristics of the customer; a confidence score evaluation unit, configured to input the conversation characteristics and the state characteristics into a confidence score evaluation model to obtain a confidence score evaluation value, wherein the confidence score evaluation model is a machine learning model and is trained using a conversation sample marked with a robot-to-human intervention point between the robot customer and the customer and a sample of the state characteristics of the customer; and a transfer determination unit, configured to transfer the customer to the human customer service if the confidence score evaluation value meets a robot-to-human intervention condition.

The specification provides a computer device for transferring a robot customer service to a human customer service. The device may include one or more processors and a non-transitory computer-readable memory coupled to the one or more processors and configured with instructions executable by the one or more processors to perform operations. The operations may include: obtaining conversation characteristics from at least one round of conversations between the robot customer service and a customer; obtaining state characteristics of the customer; inputting the conversation characteristics and the state characteristics into a confidence score evaluation model to obtain a confidence score evaluation value; and when the confidence score evaluation value meets a robot-to-human intervention condition, transferring the customer to the human customer service. The confidence score evaluation model is a machine learning model, comprising a linear sub-model input with the conversation characteristics and a deep neural network sub-model input with the state characteristics.

The specification provides a non-transitory computer-readable storage medium for transferring a robot customer service to a human customer service. The non-transitory computer-readable storage medium may store instructions executable by one or more processors to cause the one or more processors to perform operations. The operations may include: obtaining conversation characteristics from at least one round of conversations between the robot customer service and a customer; obtaining state characteristics of the customer; inputting the conversation characteristics and the state characteristics into a confidence score evaluation model to obtain a confidence score evaluation value; and when the confidence score evaluation value meets a robot-to-human intervention condition, transferring the customer to the human customer service. The confidence score evaluation model is a machine learning model, comprising a linear sub-model input with the conversation characteristics and a deep neural network sub-model input with the state characteristics.

In embodiments of the specification, the conversation characteristics obtained from the conversation between the robot and the customer and the state characteristics of the customer are used as the input of the confidence score evaluation machine learning model to obtain the confidence score evaluation value; and whether the robot customer service needs to transfer to the human customer service is determined according to the confidence score evaluation value. As the state characteristics of the customer can often reflect the customer's specific needs and how urgent the customer's needs are, the application of the embodiments of the specification improves the accuracy of the robot-to-human intervention point, which leads to higher customer satisfaction regarding the service and improves the service efficiency of a customer service center at the same time.

DETAILED DESCRIPTION

Figure 1:
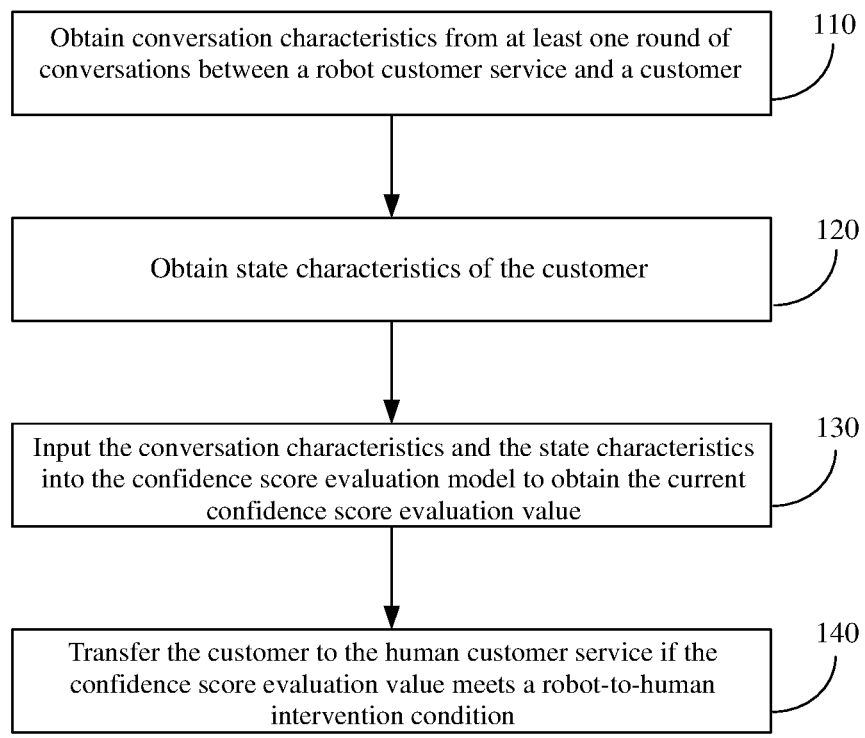
FIG. 1 shows a flowchart of a method for transferring a robot customer service to a human customer service according to an embodiment of the specification.

In the process of a customer receiving a robot customer service, the interaction therebetween during the process reflects the service effectiveness of the robot customer service. For example, if the customer repeats the same question or expresses dissatisfaction during the interaction, it usually indicates that the robot customer service has a poor ability in solving the customer's problems and a human customer service is thus needed. Therefore, conversations between the customer and the robot customer service are usually used as the basis for determining whether transferring the robot customer service to the human customer service is needed.

On the other hand, factors related to the customer personally also have an impact on the customer's needs for the human customer service. For example, customers with compromised accounts usually have a more urgent need for the human customer service; customers who inquire about their bills, on the other hand, generally have better patience in communicating with the robot customer service. Further, customers with different ages, occupations, and educational backgrounds have different acceptance for the robot customer service. Younger customers can quickly understand answers given by the robot customer service, while elder customers often need a human customer service representative's detailed instructions.

The embodiments of the specification provide a method for transferring the robot customer service to the human customer service. The customer's own factors are described using state characteristics of the customer; a confidence score evaluation value is obtained by using a confidence score evaluation model trained with conversation characteristics extracted from conversations between the robot customer service and the customer and the state characteristics of the customer. When the confidence score evaluation value meets a robot-to-human intervention condition, the customer is transferred to the human customer service. Since the confidence score evaluation value provided by the confidence score evaluation model is based not only on the process of conversations between the robot customer service and the customer, but also on the customer's needs and urgency for the human customer service which are embodied in the state characteristics of the customer, the embodiments of the specification can determine a more accurate robot-to-human intervention point, thereby improving not only the service efficiency of a customer service center, but also the satisfaction degree of the customers regarding the service.

The embodiments of the specification may be applied onto any device with computation and storage capabilities, such as mobile phones, tablet computers, personal computers (PC), laptops, servers, and other devices. Further, various functions of the embodiments of the specification may be implemented by logical nodes running on two or more devices.

In the embodiments of the specification, the conversation characteristics extracted from the conversations between the robot customer service and the customer and the state characteristics of the customer are used to establish a machine learning model, which is referred to as the confidence score evaluation model in the specification. Here, the conversation characteristics extracted from the conversations between the robot customer service and the customer may be any characteristics that may be obtained using Natural Language Processing (NLP), i.e., NLP characteristics, based on the conversations between the robot customer service and the customer. In one example, the conversation characteristics may be one or more of characteristics including the relevance between the customer's question and the robot's answer, the number of rounds of questions and answers, the types of answers (whether the answer from the robot customer service is a statement or a question, whether the answer is a concrete answer to a question or an answer that reveals all the details, etc.), the number of times the answer is repeated, whether the customer requests the human customer service, whether the customer explains his own question, and the like. The determination of the conversation characteristics and the method for obtaining the conversation characteristics from the conversations may be implemented with reference to technologies and will not be repeated in detail herein.

Other than the conversations the customer have with the robot customer service, all the other customer information that can reflect the customer's current needs for the human customer service and urgency in solving problems may be used as the state characteristics of the customer. The state characteristics and the number of the state characteristics are not limited by the embodiments of the specification. Examples for illustration are described in what follows.

First example: action record characteristics of the customer. The action record characteristics of the customer include the customer's access records to all the products within the service scope of the customer service center within a period of time, and/or function usage records, and the like. For example, action record characteristics may include pages that were opened and functional operations that were performed in an application (App) in the past 72 hours. The action record characteristics of the customer reflect the customer's usage situation regarding the consulted product within a short period of time. If a customer frequently uses the customer service function in a period of time and searches for the same knowledge point, it is likely that the customer encounters a problem that the robot customer service cannot resolve, and thus the human customer service is needed. If a customer has tried a certain function many times, the customer usually has a more urgent needs for the human customer service.

Second example: service state characteristics of the customer. The service state characteristics of the customer reflect the information of an account created by the customer for the consulted product, and may include a service opening state, an account authentication state, an account login state, and/or an abnormal account state, and the like of the customer's account. The service state characteristics of the customer can often reflect the customer's urgent needs in solving problems. If the customer's account is in the state of "suspended" (an abnormal account state) or "login from a different location" (an account login state), it is possible that the customer encounters problems such as theft and fraud, and would thus have a pressing, urgent need for the human customer service.

The third example: identity information characteristics of the customer. The identity information characteristics of the customer are information of the customer as a natural person, which may include the gender, age, residential area, and/or education level of the customer. Customers with different identity information characteristics usually have different degrees of acceptance regarding the robot customer service. For example, younger customers and highly educated customers are more accustomed to a question-and-answer mode of the robot customer service; older customers and less-educated customers, on the other hand, prefer the human customer service.

As mentioned earlier, the input for the confidence score evaluation model includes the conversation characteristics obtained from the conversations between the robot customer service and the customer and the state characteristics of the customer. The output of the confidence score evaluation model includes the confidence score evaluation value. The confidence score evaluation model is trained by using a conversation sample marked with the robot-to-human intervention point between the robot customer service and the customer and a sample of the state characteristics of the customer. The robot-to-human intervention point is the appropriate time point when the robot customer service is replaced with the human customer service during the conversation with the customer. When the confidence score evaluation model is trained, the conversation sample may be marked with the robot-to-human intervention point and the conversation characteristics, and then inputted into the confidence score evaluation model for training. Optionally, the conversation sample may only be marked with the robot-to-human intervention point; after a computer program automatically performs an NLP processing on the conversation sample and obtains the conversation characteristics, the conversation sample is then inputted into the confidence score evaluation model for training.

The machine learning algorithm used in the confidence score evaluation model may be selected according to features of an exemplary application scenario, which is not limited thereto. The confidence score evaluation model may be a machine learning model based on a support vector machine, such as a Support Vector Machine (SVC), a tree-based machine learning model, such as a Gradient Boosting Decision Tree (GBDT), a linear model, such as a Logistic Regression (LR), and may also be a neural network model, such as Deep Neural Networks (DNN), Recurrent Neural Networks (RNN), and Convolutional Neural Networks (CNN).

In one embodiment, a Wide and Deep model is used to establish the confidence score evaluation model. The Wide and Deep model includes a linear sub-model and a deep neural network sub-model, and adopts a training mode that combines the deep neural network sub-model with a shallow linear sub-model. The memorization of the linear sub-model is combined with the generalization of the deep neural network sub-model and joint training is adopted, such that training errors of the overall model are simultaneously fed back to the linear sub-model and the deep neural network sub-model for parameter updating, and parameters of the two sub-models are optimized at the same time, thereby achieving the optimal predictive ability of the overall Wide and Deep model.

During a question-and-answer process between the customer and the robot customer service, the conversation characteristics directly reflect the customer's needs for the human customer service, and are thus highly correlated characteristics. The state characteristics of the customer, on the other hand, are not directly related to the question-and-answer process, but only affect the customer's needs for the human customer service indirectly. The state characteristics are therefore the weakly correlated characteristics. In order to reflect the influence of these two types of characteristics on the results, different sub-models in the Wide and Deep learning model may be used to process these two types of characteristics. In one example, an output vector of the linear sub-model is obtained after inputting the conversation characteristics into the linear sub-model for processing; an output vector of the deep neural network sub-model is obtained after inputting the state characteristics of the customer into the deep neural network sub-model for processing; and then the output vectors of the two sub-models are combined and outputted after being calculated by a neuron.

In a training phase of the Wide and Deep learning model, whether the robot-to-human intervention point is marked may be used as an output (assuming that the confidence score evaluation value is 1 or 0). When the trained model is used for prediction, the output may be regarded as the possibility of this time point being the robot-to-human intervention point (the confidence score evaluation value is a floating point number between 0 and 1).

In the embodiments of the specification, the flow of the method for transferring the robot customer service to the human customer service is shown in FIG. 1.

Step 110, obtain the conversation characteristics from at least one round of the conversations between the robot customer service and the customer.

After the training of the confidence score evaluation model is completed, the confidence score evaluation model may be used in a real-time conversation process between the robot customer service and the customer to determine whether switching to the human customer service is needed at the time point after a customer speaks.

In the embodiments of the specification, one round of conversation may refer to the situation that the customer speaks once, or the customer and the robot customer service each speaks once. Usually, the first round of the conversations between the robot customer service and the customer is when only the customer speaks, and the second and subsequent rounds include a conversation between the robot customer service and the customer where both the robot customer service and the customer speak. Each round ends with the customer speaking, which is the time point when the robot customer service may be replaced with the human customer service; or this can be referred to as a potential robot-to-human intervention point.

One or more rounds of the conversations between the robot customer service and the customer may be taken as the basis for obtaining the conversation characteristics. For example, a certain number of rounds of conversations occurring before a time point are used as the basis for obtaining the conversation characteristics; and if the number of rounds of the conversations that have been conducted at the time point is less than the certain number of rounds, the whole conversations are taken as the basis for obtaining the conversation characteristics; optionally, the whole conversations that have been conducted may be usually used as the basis for obtaining the conversation characteristics.

Step 120, obtain the state characteristics of the customer.

According to some implementations of the customer service center and a service end of the consulted service products in an exemplary application scenario, the state characteristics of the customer may be read from a network location, a database table, and the like, where the state characteristics of the customer are stored, which is not limited thereto.

There is no temporal order relationship between step 110 and step 120. The conversations between the robot customer service and the customer are usually continuously updated as the conversation process continues; the state characteristics of the customer, however, generally do not change during one customer service process. Therefore, step 110 may be executed multiple times during one customer service process, whereas step 120 may usually be executed once.

Step 130, input the conversation characteristics and the state characteristics into the confidence score evaluation model to obtain a confidence score evaluation value.

The conversation characteristics extracted from several rounds of the conversations between the robot customer service and the customer before a time point and the state characteristics of the customer are inputted into the confidence score evaluation model to obtain the confidence score evaluation value for the time point right after the customer speaks in the conversations (i.e., the time point right after the customer speaks in that round of conversation).

Step 140, transfer the customer to the human customer service if the confidence score evaluation value meets a robot-to-human intervention condition.

If the confidence score evaluation value meets the robot-to-human intervention condition, the human customer service is needed at the time point, and the customer is transferred to the human customer service.

The robot-to-human intervention condition may be that the confidence score evaluation value is greater than or less than a confidence score threshold, depending on whether a higher confidence score evaluation value in an exemplary application scenario represents a stronger need for the human customer service or a weaker need for the human customer service. The confidence score threshold may be determined by comprehensively considering factors such as the fitting degree of the confidence score evaluation model and the conversation sample after the training, and a ratio of the number of customers to the number of human customer service representatives in an exemplary application scenario. It is also possible to set a certain standard, and the program automatically determines the confidence score threshold according to the set standard. For example, the conversation sample may be inputted into the trained confidence score evaluation model to obtain a sample confidence score evaluation value corresponding to the robot-to-human intervention point in the conversation sample; a series of different values are set for the confidence score threshold; the coverage and the accuracy of the sample confidence score evaluation value are calculated when the different values are selected for the confidence score threshold; an evaluation standard is set for the coverage and the accuracy; and the value corresponding to the best coverage and the accuracy evaluated according to the evaluation standard is taken as the confidence score threshold.

In the embodiments of the specification, the state characteristics of the customer are used to describe the customer's own factors; the conversation characteristics obtained from the conversations between the robot customer service and the customer and the state characteristics of the customer are used as the input for the confidence score evaluation machine learning model to obtain the confidence score evaluation value; the customer is transferred to the human customer service if the confidence score evaluation value meets the robot-to-human intervention condition. Since the confidence score evaluation value provided by the confidence score evaluation model is based on the customer's needs and urgency for the human customer service which are embodied in the state characteristics of the customer, the accuracy of the robot-to-human intervention point may be improved after applying the embodiments of the specification, thereby improving not only the service efficiency of a customer service center, but also the satisfaction degree of customers regarding the service.

The embodiments of the specification have been described above. Other embodiments fall within the scope of the specification. In some cases, actions or steps set forth in the specification may be performed in an order different from that in the embodiments and desired results may still be achieved. In addition, the processes depicted in the drawings do not necessarily require the shown order or sequential order to achieve the desired results. In some implementations, multitasking and parallel processing are also plausible or may be advantageous.

In one application example of the specification, a customer service center of a third-party payment platform provides on-line services for customers using its client application. Technicians of the customer center use conversation characteristics extracted from the conversations between a robot customer service and a customer and state characteristics of the customer to establish a Wide and Deep model as a confidence score evaluation model. In this application example, the state characteristics of the customer include action record characteristics, service state characteristics, and identity information characteristics of the customer.

Figure 2:
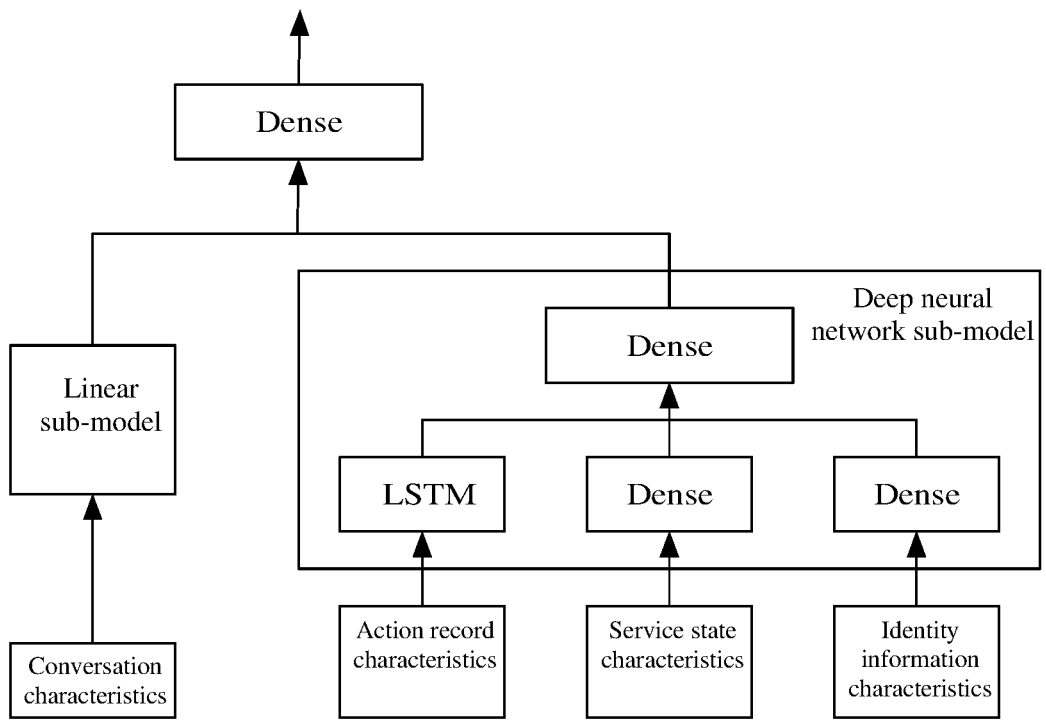
FIG. 2 shows a structural schematic diagram of a Wide and Deep model according to an application example of the specification.

The structure of the Wide and Deep model is shown in FIG. 2, in which the conversation characteristics are used as an input for a linear sub-model and state characteristics of the customer are used as an input for a deep neural network sub-model. Generally, each layer of the deep neural network sub-model in the Wide and Deep model is a dense neural layer, i.e., the neural layer uses several dense neurons for data processing. In this embodiment, the deep neural network sub-model uses one dense neural layer to process the service state characteristics, uses one dense neural layer to process the identity information characteristics, and uses one long short-term memory (LSTM) neural layer to process the action record characteristics. The output of the above three neural layers, i.e., the processing results of the three kinds of customer state characteristics, are processed and integrated by one dense neural layer into one output vector of a deep neural network sub-model. Then the output vectors of the two sub-models are integrated by one dense neural layer and used as an output of the overall model, which is the confidence score evaluation value.

After the technicians mark the robot-to-human intervention points in several history records of conversations between the robot customer service and customers, the history records are used as conversation samples; and the state characteristics of these customers are used as state characteristics samples. After a program automatically extracts the conversation characteristics from the conversation samples, the conversation characteristics of the conversation samples and the state characteristics samples are inputted into the Wide and Deep model for training.

Figure 3:
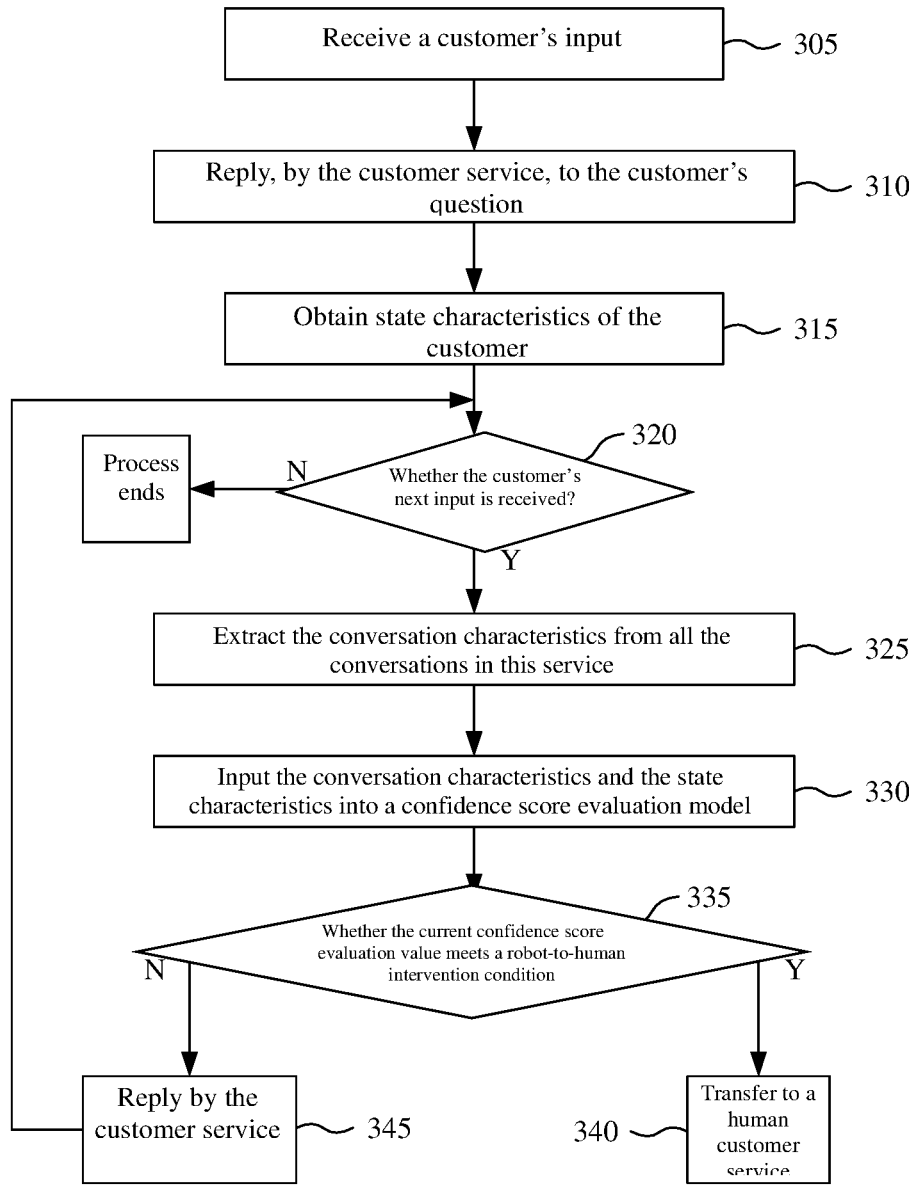
FIG. 3 shows a processing flow chart of a customer service according to an application example of the specification.

When the customer service center receives a service request from a customer, the processing procedure is as those shown in FIG. 3.

Step 305, receive a customer's input.

Step 310, reply, by the robot customer service, to the customer's question.

Step 315, obtain the action record characteristics, service state characteristics, and identity information characteristics of the customer.

Step 320, determine if a next input from the customer is received; if not, the process ends; and if so, proceed to step 325.

Step 325, extract the conversation characteristics from all the conversations between the robot customer service and the customer in this service.

Step 330, input the conversation characteristics and the state characteristics of the customer into the trained Wide and Deep confidence score evaluation model, and output a confidence score evaluation value of the model.

Step 335, determine whether the confidence score evaluation value meets a robot-to-human intervention condition; if so, proceed to step 340; and if not, proceed to step 345.

Step 340, transfer the customer to the human customer service, and end the process.

Step 345, reply, by the robot customer service, the customer, and proceed to step 320.

Figure 4:
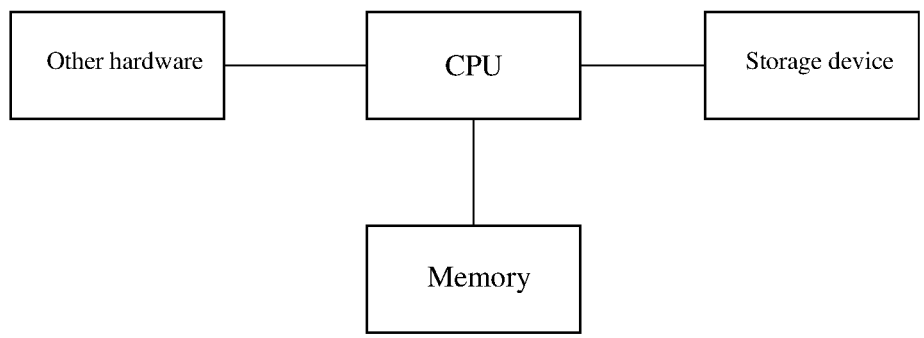
FIG. 4 shows a hardware structure diagram of a device that implements embodiments of the specification.

In accordance with the above flow implementation, the embodiments of the specification further provide an apparatus for transferring a robot customer service to a human customer service. The apparatus may be implemented using software or hardware or a combination of hardware and software. Take software implementation as an example. An apparatus in the sense of logics is formed by a central process unit (CPU) of the device at which the apparatus is located reading a corresponding computer program instruction into a memory and running the computer program instruction. In terms of hardware, in addition to the CPU, memory, and storage device shown in FIG. 4, a device where the apparatus for transferring the robot customer service to the human customer service is located usually includes other hardware such as chips for wireless signal transmission and reception, and/or other hardware such as cards for realizing network communication functions.

Figure 5:
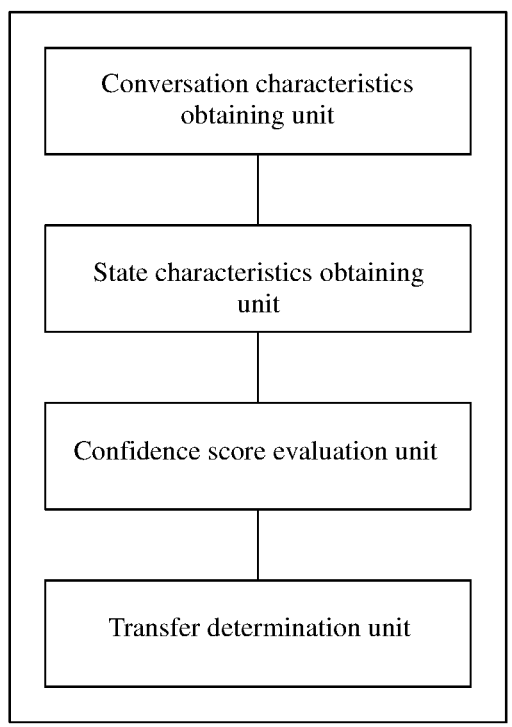
FIG. 5 shows a logical structure diagram of an apparatus for transferring the robot customer service to the human customer service according to an embodiment of the specification.

FIG. 5 shows an apparatus for transferring a robot customer service to a human customer service provided in the embodiments of the specification, the apparatus comprises a conversation characteristics obtaining unit, a state characteristics obtaining unit, a confidence score evaluation unit, and a transfer determination unit. The conversation characteristics obtaining unit is configured to obtain conversation characteristics from at least one round of conversations between a robot customer service and a customer; the state characteristics obtaining unit is configured to obtain state characteristics of the customer; the confidence score evaluation unit is configured to input the conversation characteristics and the state characteristics into a confidence score evaluation model to obtain a confidence score evaluation value, wherein the confidence score evaluation model is a machine learning model and is trained using a conversation sample marked with a robot-to-human intervention point between the robot customer service and the customer and a sample of the state characteristics of the customer; and the transfer determination unit is configured to transfer the customer to the human customer service if the confidence score evaluation value meets a robot-to-human intervention condition.

In one example, the confidence score evaluation model is a Wide and Deep model, and the Wide and Deep model includes a linear sub-model and a deep neural network sub-model. The conversation characteristics are used as the input for the linear sub-model and the state characteristics are used as the input for the deep neural network sub-model.

In the above example, the state characteristics may include at least one of the following: action record characteristics, service state characteristics, and identity information characteristics of the customer; the deep neural network sub-model uses a dense neural layer to process the service state characteristics, uses a dense neural layer to process the identity information characteristics, and uses a long short-term memory (LSTM) neural layer to process the action record characteristics.

In one embodiment, the conversation characteristics are natural language processing (NLP) characteristics, comprising one or more of the following: relevance between the customer's question and a robot's answer, a number of rounds of questions and answers, and types of answers.

In another embodiment, the state characteristics include at least one of the following: the action record characteristics, the service state characteristics, and the identity information characteristics of the customer. The action record characteristics include at least one of the following: access records and operation records of the customer within a period of time; the service state characteristics include at least one of the following: a service opening state, an account authentication state, an account login state, and an abnormal account state of a customer account; and the identity information characteristics include at least one of the following: gender, age, and residential area of the customer.

In yet another embodiment, the confidence score evaluation model comprises: a machine learning model based on a support vector machine, a tree-based machine learning model, a linear model, and a neural network model.

In still another embodiment, the robot-to-human intervention condition comprises: the confidence score evaluation value being greater or less than a confidence score threshold.

The embodiments of the specification provide a computer device comprising a storage device and a processor. Here, the storage device stores thereon a computer program executable by the processor; and the processor, when executing the stored computer program, executes the steps of the method for transferring the robot customer service to the human customer service according to the embodiments of the specification. With regard to the detailed description of the steps of the method for transferring the robot customer service to the human customer service, please refer to the above description. Details will not be repeated herein.

The embodiments of the specification provide a computer-readable storage medium having stored thereon computer programs which, when run by a processor, execute the steps of the method for transferring the robot customer service to the human customer service according to the embodiments of the specification. With regard to the detailed description of the steps of the method for transferring the robot customer service to the human customer service, please refer to the above description. Details will not be repeated herein.

The above description merely shows preferred embodiments of the specification and is not intended to limit the specification. Any modification, equivalent replacement, improvement, etc. made within the spirit and principles of the specification shall be included in the protection scope of the specification.

In a typical configuration, the computing device includes one or more of processors (CPU), input/output interfaces, network interfaces, and memories.

A memory may include a volatile storage device on a computer-readable medium, a random access memory (RAM), and/or a non-volatile memory, such as a read-only memory (ROM), or a flash memory (flash RAM). A memory is an example of the computer-readable medium.

The computer-readable medium includes non-volatile, volatile, removable and non-removable media which can store information by any methods or technologies. The information may be a computer-readable instruction, a data structure, a program module, or other data. The examples of the computer storage medium include, but not limited to, a phase-change random access memory (PRAM), a static random access memory (SRAM), a dynamic random access memory (DRAM), other types of random access memories (RAM), a read-only memory (ROM), an electrically-erasable programmable read-only memory (EEPROM), a flash memory or other memory technologies, a read-only compact disk read-only memory (CD-ROM), a digital video disk (DVD) or other optical memories, a cassette type magnetic tape, a magnetic tape, a magnetic disk memory or other magnetic storage devices, or any other non-transmission medium. The computer storage medium can be configured to store information which can be accessible by a computing device. According to the definition of the specification, the computer-readable medium does not include a transitory media, such as a modulated data signal or a carrier.

It should be further noted that the terms "comprise", "include" or any other variant thereof are intended to cover a non-exclusive inclusion. Therefore, a process, method, commodity, or apparatus that comprises a series of elements is not limited to only those elements but may include other elements not expressly listed or inherent to such process, method, commodity, or apparatus. Without more limitations, the element defined by the sentence "comprising a . . . " does not exclude the situation that the process, method, commodity, or device comprising the element further comprises another same element.

Those skilled in the art should appreciate that the embodiments of the specification may be implemented as a method, a system, or a computer program product. Accordingly, the embodiments of the specification may take the form of an entirely hardware embodiment, an entirely software embodiment, or an embodiment combining software and hardware aspects. Furthermore, the embodiments of the specification may take the form of a computer program product implemented in one or a plurality of computer-usable storage media having computer-usable program codes therein (including, but not limited to, a magnetic disk storage, a CD-ROM, an optical memory, and the like).

The invention claimed is:

1. A method for transferring a robot customer service to a human customer service, comprising:
obtaining conversation characteristics from at least one round of conversations between the robot customer service and a customer;
obtaining state characteristics of the customer;
inputting the conversation characteristics and the state characteristics into a confidence score evaluation model to obtain a confidence score evaluation value, wherein the confidence score evaluation model is a machine learning model, comprising a linear sub-model input with the conversation characteristics and a deep neural network sub-model input with the state characteristics, wherein the state characteristics comprises at least one of action record characteristics, service state characteristics, and identity information characteristics of the customer, and wherein the deep neural network sub-model comprises a first dense neural layer to process the service state characteristics, a second dense neural layer to process the identity information characteristics, and a long short-term memory (LSTM) neural layer to process the action record characteristics; and
when the confidence score evaluation value meets a robot-to-human intervention condition, transferring the customer to the human customer service.

2. The method according to claim 1, wherein:
the action record characteristics comprise at least one of the following: access records and operation records of the customer within a period of time;
the service state characteristics comprise at least one of the following: a service opening state, an account authentication state, an account login state, and an abnormal account state of a customer account; and
the identity information characteristics comprise at least one of the following: gender, age, and residential area of the customer.

3. The method according to claim 1, wherein the conversation characteristics are natural language processing (NLP) characteristics, comprising one or more of the following: relevance between the customer's question and the robot customer service's answer, a number of rounds of questions and answers, and types of answers.

4. The method according to claim 1, wherein the robot-to-human intervention condition comprises: the confidence score evaluation value being greater or less than a confidence score threshold.

5. The method according to claim 1, wherein the confidence score evaluation model is trained using a conversation sample marked with a robot-to-human intervention point between the robot customer service and the customer and a sample of the state characteristics of the customer.

6. A device for transferring a robot customer service to a human customer service, comprising one or more processors and a non-transitory computer-readable memory coupled to the one or more processors and configured with instructions executable by the one or more processors to perform operations comprising:
obtaining conversation characteristics from at least one round of conversations between the robot customer service and a customer;
obtaining state characteristics of the customer;
inputting the conversation characteristics and the state characteristics into a confidence score evaluation model to obtain a confidence score evaluation value, wherein the confidence score evaluation model is a machine learning model, comprising a linear sub-model input with the conversation characteristics and a deep neural network sub-model input with the state characteristics, wherein the state characteristics comprises at least one of action record characteristics, service state characteristics, and identity information characteristics of the customer, and wherein the deep neural network sub-model comprises a first dense neural layer to process the service state characteristics, a second dense neural layer to process the identity information characteristics, and a long short-term memory (LSTM) neural layer to process the action record characteristics; and when the confidence score evaluation value meets a robot-to-human intervention condition, transferring the customer to the human customer service.

7. The device according to claim 6, wherein:
the action record characteristics comprise at least one of the following: access records and operation records of the customer within a period of time;
the service state characteristics comprise at least one of the following: a service opening state, an account authentication state, an account login state, and an abnormal account state of a customer account; and
the identity information characteristics comprise at least one of the following: gender, age, and residential area of the customer.

8. The device according to claim 6, wherein the conversation characteristics are natural language processing (NLP) characteristics, comprising one or more of the following: relevance between the customer's question and the robot customer service's answer, a number of rounds of questions and answers, and types of answers.

9. The device according to claim 6, wherein the robot-to-human intervention condition comprises: the confidence score evaluation value being greater or less than a confidence score threshold.

10. The device according to claim 6, wherein the confidence score evaluation model is trained using a conversation sample marked with a robot-to-human intervention point between the robot customer service and the customer and a sample of the state characteristics of the customer.

11. A non-transitory computer-readable storage medium for transferring a robot customer service to a human customer service, storing instructions executable by one or more processors to cause the one or more processors to perform operations comprising:
obtaining conversation characteristics from at least one round of conversations between the robot customer service and a customer;
obtaining state characteristics of the customer;
inputting the conversation characteristics and the state characteristics into a confidence score evaluation model to obtain a confidence score evaluation value, wherein the confidence score evaluation model is a machine learning model, comprising a linear sub-model input with the conversation characteristics and a deep neural network sub-model input with the state characteristics, wherein the state characteristics comprises at least one of action record characteristics, service state characteristics, and identity information characteristics of the customer, and wherein the deep neural network sub-model comprises a first dense neural layer to process the service state characteristics, a second dense neural layer to process the identity information characteristics, and a long short-term memory (LSTM) neural layer to process the action record characteristics; and
when the confidence score evaluation value meets a robot-to-human intervention condition, transferring the customer to the human customer service.

12. The non-transitory computer-readable storage medium according to claim 11, wherein:
the action record characteristics comprise at least one of the following: access records and operation records of the customer within a period of time;
the service state characteristics comprise at least one of the following: a service opening state, an account authentication state, an account login state, and an abnormal account state of a customer account; and
the identity information characteristics comprise at least one of the following: gender, age, and residential area of the customer.

13. The non-transitory computer-readable storage medium according to claim 11, wherein the conversation characteristics are natural language processing (NLP) characteristics, comprising one or more of the following: relevance between the customer's question and the robot customer service's answer, a number of rounds of questions and answers, and types of answers.

14. The non-transitory computer-readable storage medium according to claim 11, wherein the confidence score evaluation model is trained using a conversation sample marked with a robot-to-human intervention point between the robot customer service and the customer and a sample of the state characteristics of the customer.

* * * * *